United States Patent
Ward

[19]

[11] Patent Number: 6,123,100
[45] Date of Patent: Sep. 26, 2000

[54] AMMONIA EXCESS FLOW VALVE

[76] Inventor: David P. Ward, Box 225323, Dallas, Tex. 75222

[21] Appl. No.: 09/198,338

[22] Filed: Nov. 23, 1998

[51] Int. Cl.⁷ .................................................. F16K 17/30
[52] U.S. Cl. ...................... 137/460; 137/462; 137/512.2; 137/517; 137/613
[58] Field of Search .................................. 137/460, 517, 137/613, 462, 512.2

[56] References Cited

U.S. PATENT DOCUMENTS

| | | | |
|---|---|---|---|
| 3,379,213 | 4/1968 | Billington | 137/517 |
| 3,540,469 | 11/1970 | Ward | 137/517 |
| 3,683,957 | 8/1972 | Sands | 137/460 |

*Primary Examiner*—Stephen M. Hepperle
*Attorney, Agent, or Firm*—Daniel V. Thompson

[57] ABSTRACT

An ammonia excess flow valve has a seal ring (24) slidably positioned around at least two retainer vertical members (22B). A disk (26) has a disk central opening (26A) and a disk pin opening (26B) therethrough. The disk (26) is positioned adjacent to and below a retainer (22). A conduit (28) sealably connected to the disk (26) over the disk pin opening (26B) extends upwardly therefrom. The conduit (28) functions to permit the ammonia excess flow valve (10) to be reset by equalizing pressures on both sides of the disk (26) once excess flow that trips the ammonia excess flow valve (10) is remedied, minimizing creation of vapor.

4 Claims, 4 Drawing Sheets

AMMONIA EXCESS FLOW VALVE

TECHNICAL FIELD

The present invention relates to an ammonia excess flow valve. More particularly, the present invention relates to an ammonia excess flow valve having a roll pin which permits the valve to be reset by equalizing pressures on both sides.

BACKGROUND OF THE INVENTION

Valves are well known in the art. They have differing configurations, sealing means and function. To date, there have been no valves specifically designed to equalize pressure on both sides to be utilized in an ammonia system wherein minimization of creation of vapor is essential and desirable.

Numerous innovations for an ammonia excess flow valve have been provided in the prior art that are described as follows. Even though these innovations may be suitable for the specific individual purposes to which they address, they differ from the present invention as hereinafter contrasted.

In my U.S. Pat. No. 3,540,469, Titled "Excess Flow Check Valve," I described an excess flow check valve for liquefied gaseous fluid, such as liquefied petroleum gas and anhydrous ammonia, handling equipment and particularly for safeguarding the withdrawal of such fluid from a storage tank. The valve has a two stage enclosure to permit the use of a weaker actuating spring, which is more sensitive and resilient. A plurality of lateral ports, of relatively large area and minimal quantity, are provided in its housing, to separate the flow into smaller streams of sufficient area to minimize turbulence and provide substantially uniform closing of said valve irrespective of the flow area therearound. Preferably, the ports are of maximum dimensions to permit maximum controlled flow.

The above patented invention differs from the present invention because it does not describe or claim at least one combination of the following features depicted in the present invention, such as a seal ring, a disk having a disk central opening, and a disk pin opening with a hollow roll pin extending therefrom and a retainer.

SUMMARY OF THE INVENTION

The present invention relates to an ammonia excess flow valve. More particularly, the present invention relates to an ammonia excess flow valve having a roll pin which permits the valve to be reset by equalizing pressures on both sides.

The types of problems encountered in the prior art are preventing excess flow from a valve which would cause the ammonia flowing through the valve to vaporize.

In the prior art, unsuccessful attempts to solve this problem were attempted, namely a valve which has a high pressure drop across its seats during withdrawal and filling. The dip tubes, couplings, and other fittings of different diameters which surround the valve have a significant effect on the closing moment of the valve. However, the problem was solved by the present invention because the valve is constructed in two pieces which reduces the flow restriction during normal flow preventing vaporization.

The present invention solved a long felt need for a simple inexpensive alternative to the existing valve.

Accordingly, it is an object of the present invention to provide a two piece valve having a lower disk and an annular seal ring. The present invention further includes a roll pin positioned in the disk which provides a small passageway which functions to equalize the pressure on both sides of the valve once the valve is reset.

In accordance with another feature of the present invention the housing has a housing connector which functions to adapt the ammonia excess flow valve to a piping system.

Another feature of the present invention is that a top cylinder is attached to the housing functioning to support a stem.

Yet another feature of the present invention is that the stem has a stem washer which functions to stop the fluid flow when seated.

Still another feature of the present invention is that a lower cylinder is attached to a cradle which functions to support a shaft.

Yet still another feature of the present invention is that spring is biases a seal ring away from the cradle functioning to resist the contact of a seal ring with the lower cylinder preventing flow. As flow increases pressure on the disk forces the disk to move against the spring bias. As the flow exceeds a predetermined rate the disk forces over come the spring bias and the disk forces the seal ring to a closed position. The hollow roll pin functions to permit the ammonia excess flow valve to be reset by equalizing pressures on both sides of the disk once the excess flow that trips the ammonia excess flow valve is remedied minimizing creation of vapor.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

List of Reference Numerals Utilized in the Drawings

10—ammonia excess flow valve (10)
12—housing (12)
12A—housing connector (12A)
14—top cylinder (14)
16—guide (16)
16A—guide opening (16A)
18—lower cylinder (18)
18A—lower cylinder threaded member (18A)
20—cradle (20)
20U—upper cradle (20U)
20L—lower cradle (20L)
20C—central cradle (20C)
20CA—central cradle threaded opening (20CA)
22—retainer (22)
22A—retainer cylinder (22A)
22AA—retainer cylinder opening (22AA)
22B—retainer vertical member (22B)
22C—retainer horizontal member (22C)
24—seal ring (24)
26—disk (26)
26A—disk central opening (26A)
26B—disk pin opening (26B)
28—conduit (28)
30U—upper retainer (30U)
30L—lower retainer (30L)
30LA—lower retainer seat (30LA)
30LB—lower retainer stop (30LB)
30LC—lower retainer opening (30LC)
32—shaft (32)
32A—shaft threaded member (32A)
32L—lower shaft (32L)

32U—upper shaft (32U)
34—fastener (34)
36—spring (36)
38—stem (38)
38A—stem washer (38A)
40—handle (40)
42—tank (42)
42A—tank inlet (42A)
44—down spout (44)
46—fluid (46)

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
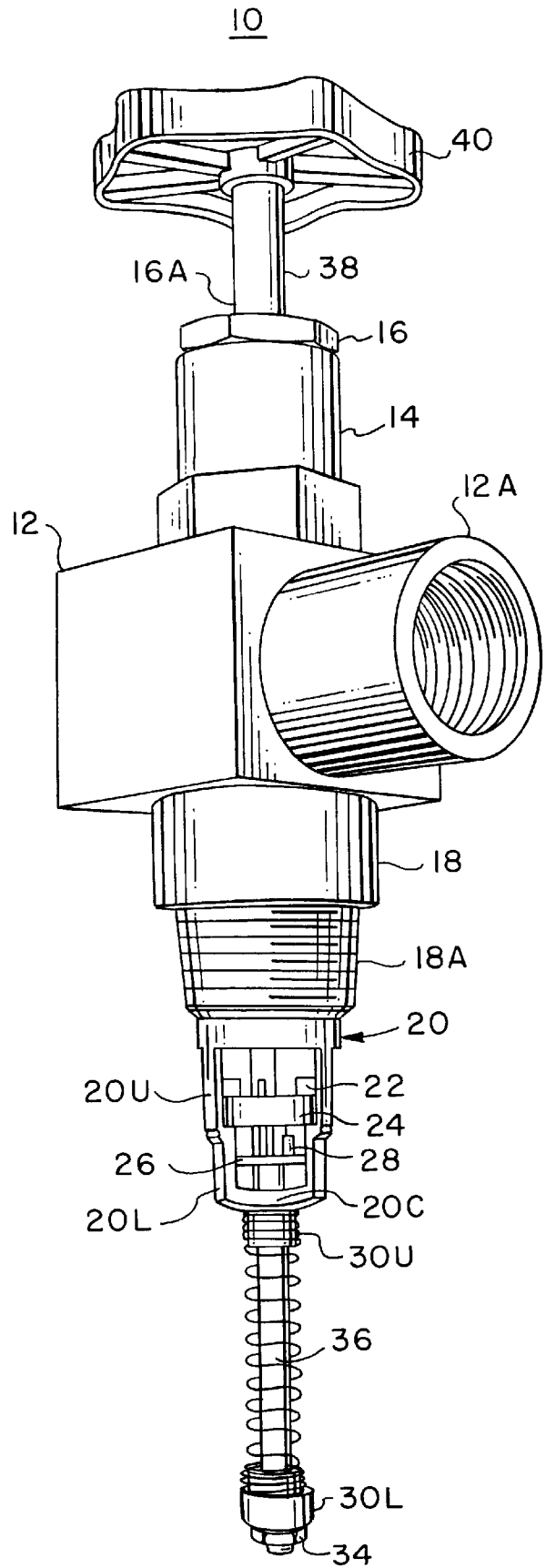
FIG. 1 is a side view of an ammonia excess flow valve (10).
Figure 2:
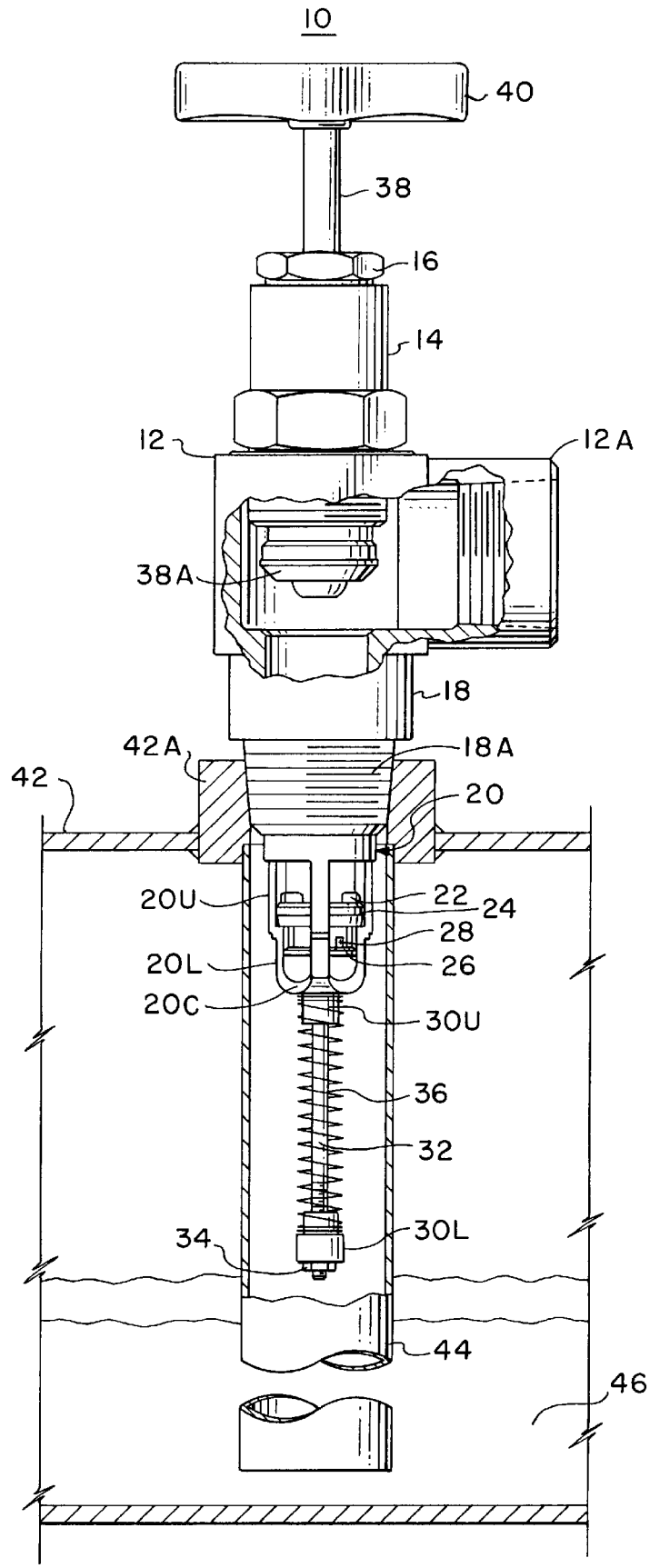
FIG. 2 is a partial cross-sectional side view of an ammonia excess flow valve (10) within a tank (42).
Figure 3:
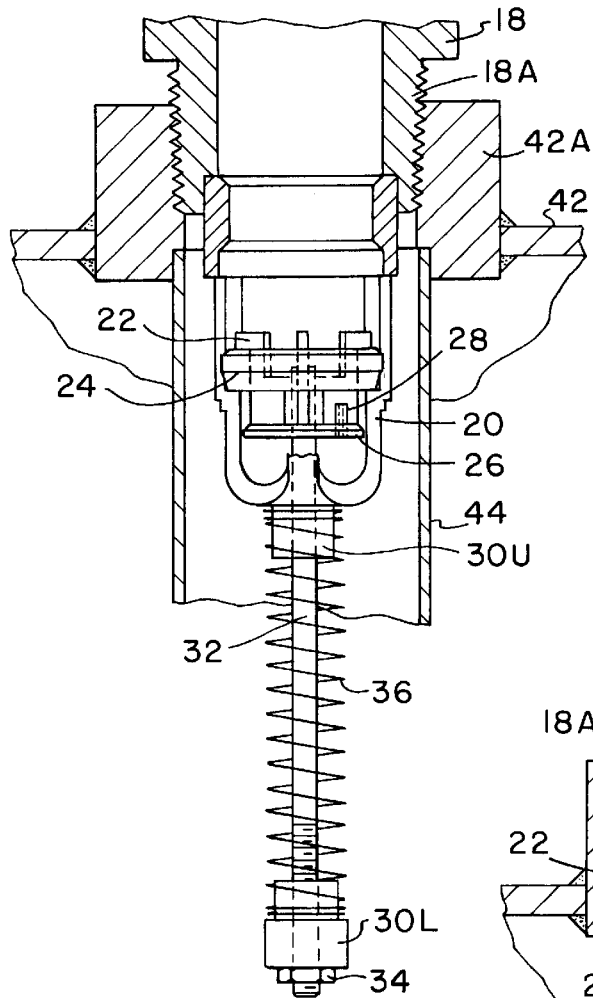
FIG. 3 is a cross-sectional side view of an ammonia excess flow valve (10) within a tank (42) in an open position.
Figure 4:
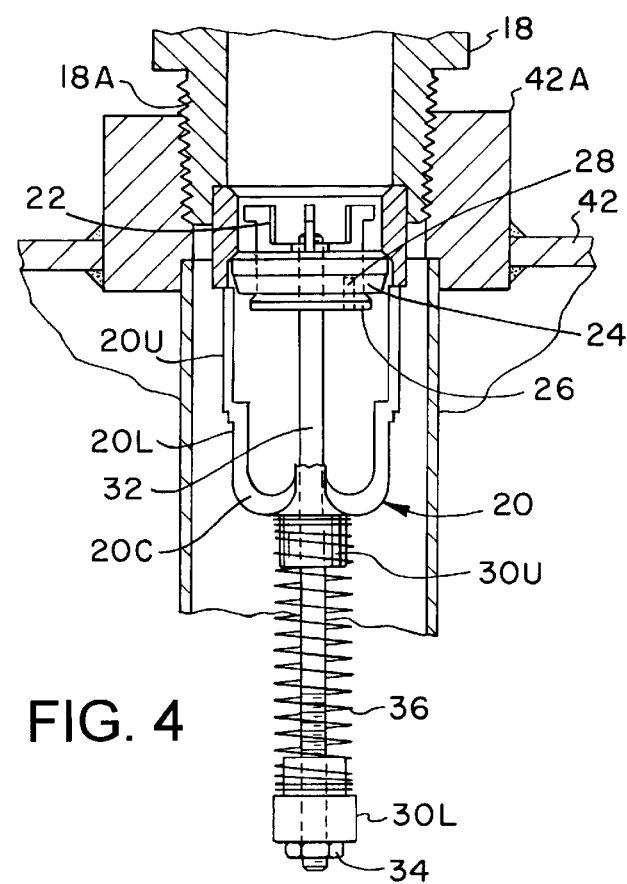
FIG. 4 is a cross-sectional side view of an ammonia excess flow valve (10) within a tank (42) in a closed position.

Referring to FIGS. 1–4, the ammonia excess flow valve (10) comprises a hollow housing (12) which includes a hollow housing connector (12A) extending horizontally therefrom.

The ammonia excess flow valve (10) further comprises an internally threaded top cylinder (14) sealably connected to a top of the housing (12).

The ammonia excess flow valve (10) further comprises an externally threaded guide (16) having a guide opening (16A) centrally positioned therein, the guide (16) being engageably positioned within the top cylinder (14).

The ammonia excess flow valve (10) further comprises a lower cylinder (18) sealably connected to a bottom of the housing (12). The lower cylinder (18) comprises a lower cylinder externally threaded member (18A) extending downwardly therefrom which is sealably mounted within the tank inlet (42A) of a tank (42) containing fluid (46). The tank inlet (42A) may optionally further comprise a down spout (44) extending therefrom within the tank (42).

The ammonia excess flow valve (10) further comprises a cradle (20) connected to a bottom of the lower cylinder threaded member (18A). The cradle (20) comprises at least two upper cradles (20U) each connected to an upper outer surface of a lower cradle (20L). Each lower cradle (20L) is connected at a bottom distal end to a central cradle (20C) having a central cradle threaded opening (20CA).

The ammonia excess flow valve (10) further comprises a retainer (22) positioned within the cradle (20). The retainer (22) comprises a retainer cylinder (22A) having a retainer cylinder opening (22AA), and at least two retainer vertical members (22B) are securely fastened at a bottom end to the retainer cylinder (22A) extending upwardly therefrom. A retainer horizontal member (22C) extends outwardly from at top of each of the at least two retainer vertical members (22B).

Figures 5, 6:
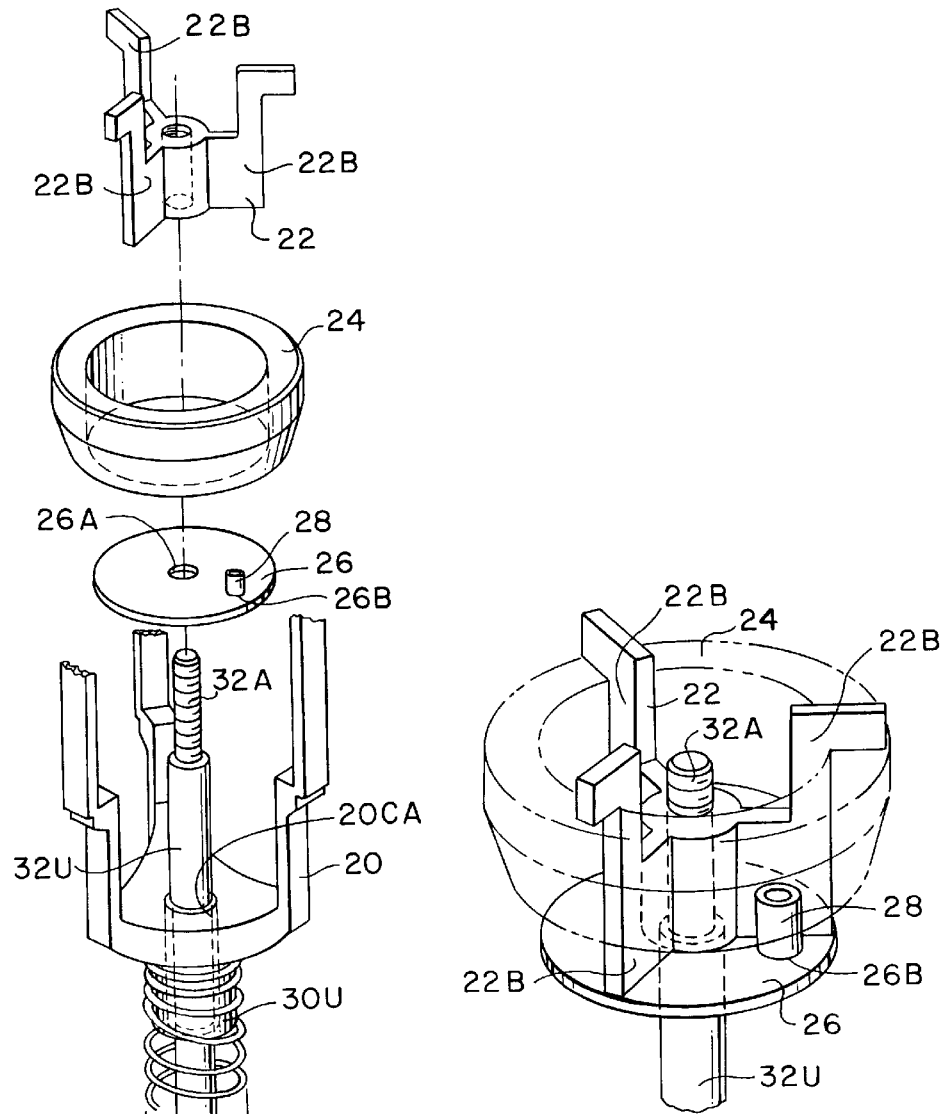
FIG. 5 is an exploded view of an ammonia excess flow valve (10).
FIG. 6 is an enlarged view of a seal ring (24) positioned around a retainer (22) which is atop of a disk (26) having a conduit (28) extending upwardly therefrom.

Now referring to FIGS. 5 and 6, the ammonia excess flow valve (10) further comprises a seal ring (24) slidably positioned around the at least two retainer vertical members (22B). The seal ring (24) is constructed from a material selected from a group consisting of plastic, plastic composite, rubber composite, and rubber. The seal ring (24) is preferably constructed from nylon. The ammonia excess flow valve (10) further comprises a disk (26), a disk central opening (26A), and a disk pin opening (26B) therethrough. The disk (26) is positioned adjacent to and below the retainer (22). The ammonia excess flow valve (10) further comprises a conduit (28), which is preferably a hollow roll pin, sealably connected to the disk (26) over the disk pin opening (26B) extending upwardly therefrom. The conduit (28) functions to permit the ammonia excess flow valve (10) to be reset by equalizing pressures on both sides of the disk (26) after the excess flow problem that trips the ammonia excess flow valve (10) is remedied, minimizing creation of vapor.

The ammonia excess flow valve (10) further comprises an upper retainer (30U) that is positioned below the cradle (20). The ammonia excess flow valve (10) further comprises a lower retainer (30L) that is positioned below the upper retainer (30U). The lower retainer (30L) comprises an lower retainer seat (30LA) and a lower retainer stop (30LB). The lower retainer (30L) further comprises a lower retainer opening (30LC) therethrough.

The ammonia excess flow valve (10) further comprises a shaft (32), and comprises a shaft threaded member (32A) engagedly attached to the disk central threaded opening (26A). The shaft (32) further comprises an upper shaft (32U) positioned through the central cradle threaded opening (20CA). The shaft (32) further comprises a lower shaft (32L) positioned through the upper retainer (30U) and the lower retainer opening (30LC). The upper shaft (32U) has a slightly smaller diameter than the lower shaft (32L).

The ammonia excess flow valve (10) further comprises a fastener (34) securely attached to a bottom distal end of the lower shaft (32L).

The ammonia excess flow valve (10) further comprises a spring (36) positioned around the shaft (32) between the upper retainer (30U) and the lower retainer (30L) within the lower retainer seat (30LA).

The ammonia excess flow valve (10) further comprises a stem (38) positioned through the guide opening (16A). The stem (38) comprises a stem washer (38A) positioned at a bottom end of the stem (38).

The ammonia excess flow valve (10) further comprises a handle (40) is engageably positioned on a top distal end of the stem (38).

It will be understood that each of the elements described above, or two or more together, may also find a useful application in other types of constructions differing from the type described above.

While the invention has been illustrated and described as embodied in an ammonia excess flow valve (10), it is not intended to be limited to the details shown, since it will be understood that various omissions, modifications, substitutions and changes in the forms and details of the device illustrated and in its operation can be made by those skilled in the art without departing in any way from the spirit of the present invention.

Whereas, the present invention has been described with respect to a specific embodiment thereof, it will be understood that various changes and modifications will be suggested to one skilled in the art and it is intended to encompass such changes and modifications as fall within the scope of the appended claims.

I claim:

1. An ammonia excess flow valve (10) comprising:
A) a hollow housing (12) which comprises a hollow housing connector (12A) extending horizontally therefrom;
B) an internally threaded top cylinder (14) sealably connected to a top of the housing (12);
C) an externally threaded guide (16) having a guide opening (16A) centrally positioned therein, the guide (16) is engageably positioned within the top cylinder (14);
D) a lower cylinder (18) sealably connected to a bottom of the housing (12), the lower cylinder (18) comprising a lower cylinder externally threaded member (18A) extending downwardly therefrom which is sealably mounted within the tank inlet (42A) of a tank (42) containing fluid (46);
E) a cradle (20) connected to a bottom of the lower cylinder threaded member (18A), the cradle (20) comprising at least two upper cradles (20U) each connected to an upper outer surface of a lower cradle (20L), each lower cradle (20L) is connected at a bottom distal end to a central cradle (20C) having a central cradle threaded opening (20CA);
F) a retainer (22) positioned within the cradle (20), the retainer (22) comprising a retainer cylinder (22A) having a retainer cylinder opening (22AA), at least two retainer vertical members (22B) are securely fastened at a bottom end to the retainer cylinder (22A) extending upwardly therefrom, a retainer horizontal member (22C) extends outwardly from at top of each of the at least two retainer vertical members (22B);
G) a seal ring (24) slidably positioned around the at least two retainer vertical members (22B);
H) a disk (26) comprising a disk central opening (26A) and a disk pin opening (26B) therethrough, the disk (26) is positioned adjacent to and below the retainer (22);
I) a conduit (28) sealably connected to the disk (26) over the disk pin opening (26B) extending upwardly therefrom, the conduit (28) functioning to permit the ammonia excess flow valve (10) to be reset by equalizing pressures on both sides of the disk (26) once excess flow that trips the ammonia excess flow valve (10) is remedied, minimizing creation of vapor;
J) an upper retainer (30U) positioned below the cradle (20);
K) a lower retainer (30L) is positioned below the upper retainer (30U), the lower retainer (30L) comprising an lower retainer seat (30LA) and a lower retainer stop (30LB), the lower retainer (30L) further comprising a lower retainer opening (30LC) therethrough;
L) a shaft (32) comprising a shaft threaded member (32A) engagedly attached to the disk central threaded opening (26A), the shaft (32) further comprising an upper shaft (32U) positioned through the central cradle threaded opening (20CA), the shaft (32) further comprising a lower shaft (32L) positioned through the upper retainer (30U) and the lower retainer opening (30LC), the upper shaft (32U) having a slightly smaller diameter than the lower shaft (32L);
M) a fastener (34) securely attached to a bottom distal end of the lower shaft (32L);
N) a spring (36) is positioned around the shaft (32) between the upper retainer (30U) and the lower retainer (30L) within the lower retainer seat (30LA);
O) a stem (38) positioned through the guide opening (16A), the stem (38) comprising a stem washer (38A) positioned at a bottom end of the stem (38); and
P) a handle (40) is engageably positioned on a top distal end of the stem (38).

2. The ammonia excess flow valve (10) as described in claim 1, wherein the conduit (28) is a hollow roll pin.

3. The ammonia excess flow valve (10) as described in claim 1, wherein the seal ring (24) is constructed from a material selected from a group consisting of plastic, plastic composite, rubber composite, and rubber.

4. The ammonia excess flow valve (10) as described in claim 3, wherein the seal ring (24) is constructed from nylon.

* * * * *